3,686,012
STABLE SOLUTIONS OF BASIC LEAD SOAPS
Alfred Fischer, Bronx, N.Y., and Irene A. E. Fraser, Toronto, Ontario, Canada, assignors to Tenneco Chemicals, Inc.
No Drawing. Filed Nov. 2, 1970, Ser. No. 86,362
Int. Cl. C09f 9/00
U.S. Cl. 106—310
13 Claims

ABSTRACT OF THE DISCLOSURE

Stable solutions of basic lead soaps suitable for use as paint driers are obtained by using a solvent for the soaps which comprises an ether having saturated aliphatic and/or aromatic hydrocarbon groups. The monohydroxylated polyethers are preferred.

---

Metal salts of organic acids have long been used in drying oil compositions and in surface-coating compositions containing these oils to hasten the drying process and to promote the polymerization of the unsaturated oils to dry, mechanically-resistant coatings. To be useful commercially as a drier, a metal salt should be stable indefinitely in storage, and it should be completely soluble in the hydrocarbon solvents ordinarily used in drier compositions as well as in drying oils, semi-drying oils, and vehicles prepared from these oils. It should form hydrocarbon solutions which have relatively low viscosity even at high metal salt concentrations so as to permit its ready dispersion in the vehicle, and it should not discolor nor precipitate from the vehicle on prolonged storage. The metal salt should be effective as a drier in an amount that is not detrimental to the gloss, flexibility, adhesion, and other properties of the coating composition. In addition the metal salt should be uniform in composition and should be relatively low in cost.

The most useful acids forming basic lead salts have been found to be certain saturated, branched-chain acyclic monocarboxylic acids. The basic lead salts contain a greater proportion of the active lead component than do the neutral lead salts. The basicity of such salts is measured by the mole ratio of acid-to-lead in the salt, and a basic salt has an acid:lead ratio of less than 2. Generally, basic lead salts that are in commercial use have an acid:lead ratio of less than 1.7 and as low as 0.7, or even lower.

Because of their low cost and ready availability, hydrocarbon solvents have generally been most widely used as the solvent carrier for the basic lead salts. However, a tendency for the solution to discolor or for a precipitate to form has been noted. This becomes more significant, the more basic becomes the metal salt. However, even solutions of salts that at first dissolve readily in hydrocarbon solvents, without any deep discoloration, have been found, upon long storage, especially at freezing or sub-freezing temperatures, to discolor or even to precipitate. The cause of this instability in solution is not known; however, the problem is significant commercially. These driers are often used for white or pastel-colored paints. A strong yellow discoloration in the drier additive could stain or discolor the paint. In any event, a prospective purchaser would be hesitant about purchasing and/or using an off-color product. If the solution were to precipitate, of course, the advantage of the product, i.e. as a uniform readily mixed liquid solution, would be lost.

The problem of precipitation has been previously considered by various workers in the field who have attempted to deal with it in various ways. The addition of various polyoxyalkylene glycols, such as triethylene glycol, dipropylene glycol, and tripropylene glycol was suggested by workers such as Fischer, in U.S. Pat. No. 2,807,553. The art also recognized that certain alcohols, such as 2-ethylhexanol, would be helpful in improving the solubility of the basic lead salts in the common solvents. A somewhat related area is the improvement of solubility by forming what is apparently a mixed lead salt of the acid and of dipropylene glycol or an alkyl monoether of ethylene glycol or of propylene glycol. The mixed salt is formed by adding the glycol or glycol ether during the reaction between litharge and the acid at elevated temperatures (see French Pat. No. 1,528,804). The problems of yellowing, however, had not previously been discussed by the art.

A useful discussion on drier acid salts generally, especially with regard to the preparation and use of basic lead soaps, is set forth in article by A. Fischer, "Utility of Branched-chain Carboxylic Acids in the Manufacture of Driers," J. Amer. Oil Chem. Soc., 43, No. 7, pp. 469–47.

In accordance with the present invention, it has now been found that color-stable clear solutions of water-insoluble basic lead salts of saturated branched-chain, acyclic acids which contain from 7 to 18 carbon atoms can be obtained by utilizing a solvent comprising, at least one ether having the general formula:

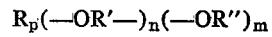

$$R_p(-OR'-)_n(-OR'')_m$$

wherein $m$ and $n$ can each be zero or an integer in the range of from 1 to about eight and preferably to about four, $p$ is zero or 1, R, R' and R" are saturated aliphatic or aromatic hydrocarbon groups or inertly substituted such groups, such as substituted with a halogen atom, such as chlorine, R and R" can contain from one to about eight carbon atoms and R' from two to about eight carbon atoms. When the sum of $n$ and $m$ is 3 or more, one of R" can be a hydrogen atom. A cyclic ether can be formed by e.g. two (—O—R'—) groups linked in a ring structure.

The various R' and R" groups can be each different in a given compound; for example, in the above formula, if $n=2$, the two R' groups can each be different, e.g. one ethylene and one propylene group. Similarly, higher molecular weight R, R' and R" groups, e.g. $C_4$- or $C_5$-groups can be present in any of a variety of isomeric forms, straight or branched-chain, or in cyclic form.

The R, R' and R" groups, therefore, can be saturated aliphatic groups such as alkyl or alkylene groups, such as methyl, ethyl, propyl, butyl, hexyl, octyl, ethylene, propylene, butylene and octylene and the various isomers thereof; and aromatic groups, such as naphthyl, phenyl, phenylene, alkyl substituted such groups such as ethylphenyl, propylphenyl and dimethylphenyl and alkylene-substituted such groups, such as phenethylene; corresponding trivalent and tetravalent groups such as neopentyl can also be present. As shown, R" is a monovalent group and R' a divalent group.

These ethers are generally commercially available products. It has been found that although all ethers counteract the yellow discoloration appearing in solutions of basic lead soaps in inert solvents, the monohydroxy ethers have the added effectiveness of acting to prevent or limit crystallization or precipitation of the salt from solution upon standing, especially at lower storage temperature. Generally, therefore, the preferred ethers are those which are commercially readily available at the lowest cost. It has been found, however, that ethers having more than one hydroxyl group present one additional problem in that they tend to react with the basic lead salt to produce a "neutral" mixed acid-alcoholate salt.

Preferably, the ether used is not highly volatile. Usually, a boiling point of at least about 100° C. is preferred. However, when the ether is mixed with a solvent for the salt, which forms a high-boiling azeotrope, the combined boiling point is the determining value.

Examples of useful ethers include monoethers such as dibutyl ether; di-n-hexylether; diisoamyl ether; dilauryl ether; dichloroisopropyl ether; ethyl n-butyl ether; and isoamyl n-propyl ether; and polyethers, such as 1,2-dimethoxy-; 1,2-diethoxy-; 1,2-dibutoxyethane; 1,4-diethoxybutane; 1,5-dibutoxypentane; 1,4-dioxane; 1,4-(diethoxymethyl) cyclohexane; diphenoxyethane; tetra-n-propoxymethylmethane; bis (2-ethoxyethyl) ether $$(C_2H_5-O-C_2H_4-O-C_2H_4-O-C_2H_5)$$

bis (2-butoxyethyl) ether; bis (2-methoxyethoxy) ethane $(CH_3-O-C_2H_4-OC_2H_4-O-C_2H_4-OCH_3)$; 1 - (2-ethoxypropoxy)-2-(2-ethoxypropoxy) propane; bis (2-ethoxyethoxy ethane; bis (2-chloroethoxy) ethane; 2-(2-methoxyethoxy) ethanol $$(CH_3-O-C_2H_4-O-C_2H_4OH)$$

2-(2-ethoxyethoxy) ethanol; 2-(2-butoxyethoxy) ethanol; 2-(2-hexoxyethoxy) ethanol; 1-(2-methoxypropoxy)-2-propanol; 1-(3-butoxyethoxy-2-propanol; 2-[2-(2-methoxyethoxy) ethoxy] ethanol $$(CH_3O-(C_2H_4O)_2C_2H_4OH)$$

2[2-(2-ethoxyethoxy) ethoxy] ethanol; (methoxypropoxypropoxy) propanol $$(CH_3O-C_3H_6-O-C_3H_6OC_3H_6OH)$$

(methoxybutoxybutoxy) butanol; $C_2H_6O(C_3H_6O)_4C_2H_5$ and $CH_3O-(C_2H_4O)_2(C_3H_6O)_3-CH_3$.

The prevent invention is directed to improving the solubility of, and the color stability of solutions of, the basic salts of these acids. Generally, salts having a degree of basicity, i.e. a mole ratio of acid-to-lead, of less than about 1.7 suffer from the problem of discoloration, generally yellowing, of its solutions in an inert solvent, such as mineral spirits. Hydrocarbon solvents such as mineral spirits, Stoddard's solvent, benzene, toluene, xylene, naphtha, kerosene, dipentene, turpentine and the like have been preferred because of their ready availability and economy and low toxicity and odor. Other inert solvents include chlorinated hydrocarbon and the higher alcohols, such as dichloroethylene and isooctanol.

The present invention is directed to solutions that comprise at least one ether as defined above. The ethers vary in solvent power for the basic lead salts. Generally, polyethers are better solvents for the more basic salts, and the mono-hydroxylated polyethers are the most preferred as solvents. The anti-yellowing activity of the ether is obtained with as little as one percent by wt., and preferably 1.5 percent, of an ether by weight of the lead as metal, present in a solution in admixture with other solvents. The maximum amount of ether than can be present is limited only by the solubility of the basic salts in the ether. For example, the monoethers have the least solvent activity for the basic salt. The polyethers and monohydroxy polyether can be present as a major proportion of or even as the sole, solvent for the basic lead salt.

The basic lead salts of the saturated, branched-chain acids defined above form solutions in hydrocarbons of low viscosity. Salts of the preferred group of these acids are completely miscible with the oils and resins commonly used in surface coatings. When fresh, they do not impart appreciable color or oder to surface coating compositions. The salts improve the drying performance of paints, varnishes and other coating compositions without affecting their film properties, such as gloss and flexibility. The acids used to form these salts are uniform in quality, low in cost, and readily available commercially.

The preferred acids that have been successfully used to prepare basic lead salts are the saturated, branched-chain, acyclic monocarboxylic acids which contains from 7 to 18 carbon atoms, and preferably from 7 to 13 carbon atoms, which have at least six carbon atoms in the longest straight chain and which have no substituent on the carbon atom alpha to the carboxyl group. Examples of such acids include 3,5,5-trimethylhexanoic acid, 4,5-dimethylhexanoic acid, 4-ethylnonanoic acid, 3-ethyloctanoic acid, 3-methylhexanoic acid and the $C_8$, $C_{10}$ and $C_{13}$ Oxo acids prepared by the oxidation of mixtures of the corresponding aldehydes in accordance with the process described in U.S. Pat. No. 3,124,475 to Fischer et al. As described in Fischer et al., the aldehydes are obtained from the reaction of $C_{7-17}$ olefins with carbon monoxide and hydrogen in the presence of a carbonylation catalyst.

The olefins from which the aldehydes are prepared may be those that occur in nature or they may be polymers of lower molecular weight olefins, such as propylene, butylene, or isobutylene. The procedures by which these olefins are converted to aldehydes are well known in the art.

The basic lead salts can be prepared from the above acids directly by reaction in a suitable solvent with the required proportion of litharge to obtain a basic salt having the required degree of basicity. Highly basic salts, having a degree of basicity of 1.0 or less can be readily obtained by the process described in British Pat. No. 891,858.

Usually solutions of lead driers should be as concentrated as possible in order to minimize cost of shipping by eliminating the inactive solvent. This invention accordingly has its greatest usefulness in obtaining very concentrated solutions, for example, containing at least 16 percent lead, and preferably at least 24 percent lead, as the metal. Solutions in solvents that are, in major proportion, hydrocarbon can be as concentrated as 40% lead by weight.

The lead salts in the present invention can be used alone in drier compositions or they can be used in combination with other lead salts or other metal salts prepared from the same or other organic acids, such as naphthenic acids or tall oil fatty acids. In addition to the metal salts and the solvent, the dried compositions can contain additives, such as stabilizers, dispersing agents, and antiskinning agents, in the amounts ordinarily employed for the purposes indicated.

In a preferred composition, salts of a mixture of acids are used. A preferred mixture is, for example, the lead salts of isononanoic acid (3,5,5-trimethylhexanoic acid) and 2-ethylhexanoic acid. This is a mixture of an alphaacid and a beta acid, i.e. a 2-position substituted acid and a 3-position substituted acid.

The following are examples illustrative of the present invention, but the specific materials set out are not to be considered as limiting the scope of the invention.

EXAMPLE 1

A slurry of 194.5 g. (0.87 mol) litharge in 120 g. mineral spirits was agitated in a liter beaker with a propeller mixer while adding 185 g. (1.17 mols) 3,5,5-trimethylhexanoic acid and 15 g. (0.087 mol) Versatic 911 Synthetic acids (a mixture of saturated trialkylacetic acids containing 9, 10 and 11 carbon atoms). The mixture was heated to 230° F. for fifteen minutes to eliminate the water formed during the reaction, and then filtered. The clear filtrate was cooled to room temperature and divided into two parts. To the first part was added 3 g. bis (2-ethoxyethyl) ether and enough additional mineral spirits to form a solution containing 36% lead. To the second part was added only enough mineral spirits to form a solution containing 36% lead. Both solutions were initially a pale yellow color.

The second portion turned a yellow-green color after storage for seven days in a clear glass bottle at room temperature. The ether-containing first portion retained its initial straw color even after seven months storage, was soluble in linseed oil, and was an effective drier.

EXAMPLE 2

Example 1 is repeated, but substituting 3.5 g. bis (2-ethoxyethoxy) ethane for the ether of Example 1. The same results are obtained.

EXAMPLE 3

Example 1 is repeated, but substituting 5 g. bis (2-butoxyethoxy) ether for the ether of Example 1. The same results are obtained.

EXAMPLE 4

Example 1 is repeated, but substituting 5 g. 2-(2-ethoxyethoxy) ethanol for the either of Example 1. The same results are obtained.

EXAMPLE 5

The procedure of Example 1 is repeated except that a mixture of 110 g. mineral spirits and 10 g. 2-(2-ethoxyethoxy) ethanol is used to prepare the lead salt in place of pure mineral spirits. The cooled filtrate was diluted with only mineral spirits and the resulting 36% lead solution retained its initial pale color, was soluble in oil and was an effective drier.

EXAMPLE 6

Example 5 is repeated but substituting 14 g. 2-ethylhexoic acid for Versatic acid. The same results are obtained.

EXAMPLE 7

Example 1 is repeated, but 169 g. (1.17 m.) $C_8$-Oxo acid is substituted for the isonoanoic acid. The $C_8$-Oxo acid is a mixture of various $C_8$-isomers, the major components comprising 3,4-dimethyl-; 3,5-dimethyl-; and 4,5-dimethyl-hexanoic acids. The same results are obtained.

EXAMPLE 8

Example 7 is repeated but 8 g. dibutyl ether is substituted for the ether of Example 7. The same results are obtained.

EXAMPLE 9

A slurry of 130 g. (0.58 mol) litharge in 250 g. mineral spirits is agitated in a beaker with a propeller mixer while adding 125 g. (0.79 mol) is isonoananoic acid (3,5,5-trimethylhexanoic acid). The mixture is heated to 230° F. to insure all of the water formed is boiled away; the dried reaction mixture is then filtered. The acid content is measured and the acid/lead ratio is 1.38. The clear filtrate is divided into two halves. To one half is added 6 g. 2-(2-ethoxyethoxy) ethanol and additional mineral spirits needed to form a solution containing 24% lead by wt. To the second half is added enough mineral spirits also to form a solution containing 24 percent lead by weight. Both solutions are a pale straw-color initially.

The second solution, free from the ether turns a deep yellow color after being stored at room temperature in a clear glass container for five days. Subsequently stored at 0° F., a small amount of precipitate forms after 7 days.

The first solution containing ether retained its light color and did not form any precipitate even after eight months storage at 0° F. The stabilizing effectiveness of the ether is thus shown.

We claim:

1. A composition of matter comprising a solution of a basic salt of lead and a saturated, branched-chain, acyclic, monocarboxylic acid having at least six carbon atoms in its longest straight chain, no substituent in the position alpha to the carboxyl group, and containing from 7 to 18 carbon atoms, and a liquid solvent for the salt comprising an ether having the formula:

$$R_p(-OR'-)_n(-OR'_2)_m$$

wherein R, R' and R'' can be selected from the group consisting of saturated aliphatic hydrocarbon groups containing up to about eight carbon atoms, aromatic hydrocarbon groups containing up to 12 carbon atoms and inertly substituted such groups, m is an integer from one to eight, n can be zero or an integer from one to eight, and p is one, when the sum of m plus n is at least three, one of R'' can be hydrogen, the ether being present in an amount of at least about one percent by weight of lead as metal.

2. A composition in accordance with claim 1 wherein the salt is a lead salt of 3,5,5-trimethylhexanoic acid.

3. A composition in accordance with claim 1 wherein the acid-to-metal ratio is less than about 1.7.

4. A composition in accordance with claim 1 wherein each R, R' and R'' is a saturated aliphatic group containing not more than four carbon atoms.

5. A composition in accordance with claim 4 wherein R' is selected from the group consisting of ethylene, and propylene.

6. A composition in accordance with claim 1 wherein m is 1 and n is at least two.

7. A composition in accordance with claim 1 wherein m is 1, p is 1 and n is zero and R and R'' contain a total of at least eight carbon atoms.

8. A composition in accordance with claim 1 wherein the ether is 2-(2-ethoxyethoxy) ethanol.

9. A composition in accordance with claim 1 wherein the solvent comprises the ether plus a second, inert solvent.

10. A composition in accordance with claim 9 wherein the inert solvent is selected from the group consisting of hydrocarbon solvents, halo-substituted hydrocarbon solvents and higher alcohols.

11. A composition in accordance with claim 1, wherein the R, R' and R'' groups can be inertly substituted with halogen atoms.

12. A composition in accordance with claim 1, wherein m is one.

13. A composition of matter comprising a solution of a basic salt of lead and a saturated, branched-chain, acyclic, monocarboxylic acid having at least six carbon atoms in its longest straight chain, no substituent in the position alpha to the carboxyl group, and containing from 7 to 18 carbon atoms, and a liquid solvent for the salt comprising a cyclic ether having the formula $$(-OR'-)_n$$

wherein n is an integer from two to eight and R'' is selected from the group consisting of saturated aliphatic hydrocarbon groups containing up to about eight carbon atoms, aromatic hydrocarbon groups containing up to 12 carbon atoms and inertly substituted such groups, the ether being present in an amount of at least about one percent by weight of lead as metal.

References Cited

UNITED STATES PATENTS

| | | | |
|---|---|---|---|
| 2,807,553 | 9/1957 | Fisher | 106—243 |
| 3,124,475 | 3/1964 | Fisher | 106—310 |

THEODORE MORRIS, Primary Examiner

U.S. Cl. X.R.

106—243, 256, 264

UNITED STATES PATENT OFFICE
CERTIFICATE OF CORRECTION

Patent No. 3,686,012      Dated August 22, 1972

Inventor(s) Alfred Fischer and Irene A. E. Fraser

It is certified that error appears in the above-identified patent and that said Letters Patent are hereby corrected as shown below:

Column 3, line 19, after "ethoxyethoxy" insert -- ) --.

Column 3, line 68, change "oder" to -- odor --.

Column 6, line 4, replace the formula with the following:
$$R_p(-OR'-)_n(-OR'')_m$$

Column 6, line 53, change " R" " to -- R' --.

Column 6, line 64, change "Fisher" to -- Fischer --.

Column 6, line 65, change "Fisher" to -- Fischer --.

Signed and sealed this 20th day of March 1973.

(SEAL)
Attest:

EDWARD M. FLETCHER, JR.          ROBERT GOTTSCHALK
Attesting Officer                Commissioner of Patents